US011800554B2

(12) United States Patent
Lee

(10) Patent No.: US 11,800,554 B2
(45) Date of Patent: Oct. 24, 2023

(54) METHOD AND APPARATUS FOR HANDLING TASKS IN PARALLEL

(71) Applicant: LG Electronics Inc., Seoul (KR)

(72) Inventor: Ki-Dong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 308 days.

(21) Appl. No.: 17/350,829

(22) Filed: Jun. 17, 2021

(65) Prior Publication Data
US 2021/0400675 A1    Dec. 23, 2021

Related U.S. Application Data

(60) Provisional application No. 63/039,998, filed on Jun. 17, 2020.

(51) Int. Cl.
H04W 72/563    (2023.01)
H04W 24/02    (2009.01)
H04W 16/10    (2009.01)
H04W 72/53    (2023.01)

(52) U.S. Cl.
CPC ......... *H04W 72/563* (2023.01); *H04W 16/10* (2013.01); *H04W 24/02* (2013.01); *H04W 72/53* (2023.01)

(58) Field of Classification Search
CPC .... H04W 72/563; H04W 72/53; H04W 16/10
See application file for complete search history.

(56) References Cited

U.S. PATENT DOCUMENTS

| 11,025,707 | B1* | 6/2021 | Luker | H04L 41/5064 |
| 2004/0143833 | A1* | 7/2004 | Heyrman | G06F 9/5044 |
| | | | | 718/100 |
| 2018/0122376 | A1* | 5/2018 | Kojima | G10L 15/22 |
| 2018/0150299 | A1* | 5/2018 | Balle | H04L 41/0895 |
| 2018/0293488 | A1* | 10/2018 | Dang | G06N 3/045 |
| 2019/0101923 | A1* | 4/2019 | Sun | B60W 30/00 |
| 2020/0026562 | A1* | 1/2020 | Bahramshahry | H04L 41/5009 |
| 2021/0004163 | A1* | 1/2021 | Xu | G06F 3/065 |

OTHER PUBLICATIONS

3rd Generation Partnership Project; Technical Specification Group Services and System Aspects, "Service Aspects; Service Principles (Release 17)," 3GPP TS 22.101, V17.1.0, dated Dec. 2019, 104 pages.

* cited by examiner

Primary Examiner — Ajay Cattungal
(74) Attorney, Agent, or Firm — Fish & Richardson P.C.

(57) ABSTRACT

The present disclosure relates to handling tasks in parallel. In an embodiment, a method performed by a device comprises determining a type of tasks allowed to be performed in parallel based on a configuration received from a network, and performing tasks corresponding to the type while rejecting tasks not corresponding to the type.

16 Claims, 12 Drawing Sheets

METHOD AND APPARATUS FOR HANDLING TASKS IN PARALLEL

CROSS-REFERENCE TO RELATED APPLICATIONS

Pursuant to 35 U.S.C. § 119 (e), this application claims the benefit of U.S. Provisional Application No. 63/039,998, filed on Jun. 17, 2020, the contents of which are all hereby incorporated by reference herein in their entirety.

BACKGROUND OF THE DISCLOSURE

Field of the Disclosure

The present disclosure relates to method and apparatus for handling tasks in parallel.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In various scenarios, a robot as a UE may be used to handle various requests from a single customer, but a robot as a UE is so limited that it cannot handle multiple requests from multiple customers. The cost effectiveness of operating a robot (as a UE) for potentially many customers (i.e., improving utilization) is very important for enterprise or personal users of robots to consider as robots are very expensive.

SUMMARY OF THE DISCLOSURE

Technical Problem

An aspect of the present disclosure is to provide method and apparatus for handling tasks in parallel.

An aspect of the present disclosure is to provide method and apparatus for performing tasks related to a single user identity in parallel.

An aspect of the present disclosure is to provide method and apparatus for performing tasks related to multiple user identities in parallel.

Technical Solution

According to an embodiment of the present disclosure, a method performed by a device comprises: receiving, from a network, a configuration for enabling multiple tasks to be performed in parallel; determining a type of tasks allowed to be performed in parallel based on the configuration; receiving a first input for requesting to perform a first task related to the type, wherein the first input is related to a first user identity; initiating to perform the first task related to the type; receiving a second input for requesting to perform a second task while performing the first task related to the type, wherein the second input is related to a second user identity; based on that the second task is related to the type, initiating to perform the second task; and based on that the second task is related to a different type, rejecting to perform the second task.

According to an embodiment of the present disclosure, a device in a wireless communication system comprises: a transceiver; a memory; and at least one processor operatively coupled to the transceiver and the memory, and configured to: control the transceiver to receive, from a network, a configuration for enabling multiple tasks to be performed in parallel; determine a type of tasks allowed to be performed in parallel based on the configuration; receive a first input for requesting to perform a first task related to the type, wherein the first input is related to a first user identity; initiate to perform the first task related to the type; receive a second input for requesting to perform a second task while performing the first task related to the type, wherein the second input is related to a second user identity; based on that the second task is related to the type, initiate to perform the second task; and based on that the second task is related to a different type, reject to perform the second task.

According to an embodiment of the present disclosure, a computer-readable medium has recorded thereon a program for performing each step of a method on a computer, the method comprising: receiving, from a network, a configuration for enabling multiple tasks to be performed in parallel; determining a type of tasks allowed to be performed in parallel based on the configuration; receiving a first input for requesting to perform a first task related to the type, wherein the first input is related to a first user identity; initiating to perform the first task related to the type; receiving a second input for requesting to perform a second task while performing the first task related to the type, wherein the second input is related to a second user identity; based on that the second task is related to the type, initiating to perform the second task; and based on that the second task is related to a different type, rejecting to perform the second task.

According to an embodiment of the present disclosure, a processor for a wireless device in a wireless communication system is configured to control the wireless device to perform operations comprising: receiving, from a network, a configuration for enabling multiple tasks to be performed in parallel; determining a type of tasks allowed to be performed in parallel based on the configuration; receiving a first input for requesting to perform a first task related to the type, wherein the first input is related to a first user identity; initiating to perform the first task related to the type; receiving a second input for requesting to perform a second task while performing the first task related to the type, wherein the second input is related to a second user identity; based on that the second task is related to the type, initiating to perform the second task; and based on that the second task is related to a different type, rejecting to perform the second task.

Advantageous Effect

The present disclosure may have various advantageous effects.

For example, according to various embodiments, multiple tasks related to a single user identity or multiple user identities can be performed in parallel effectively, which improves the utilization of robots, so that the average waiting time for a customer with a task to be performed can be reduced and the number of robots required for the tasks to be performed can be reduced.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Figure 1:
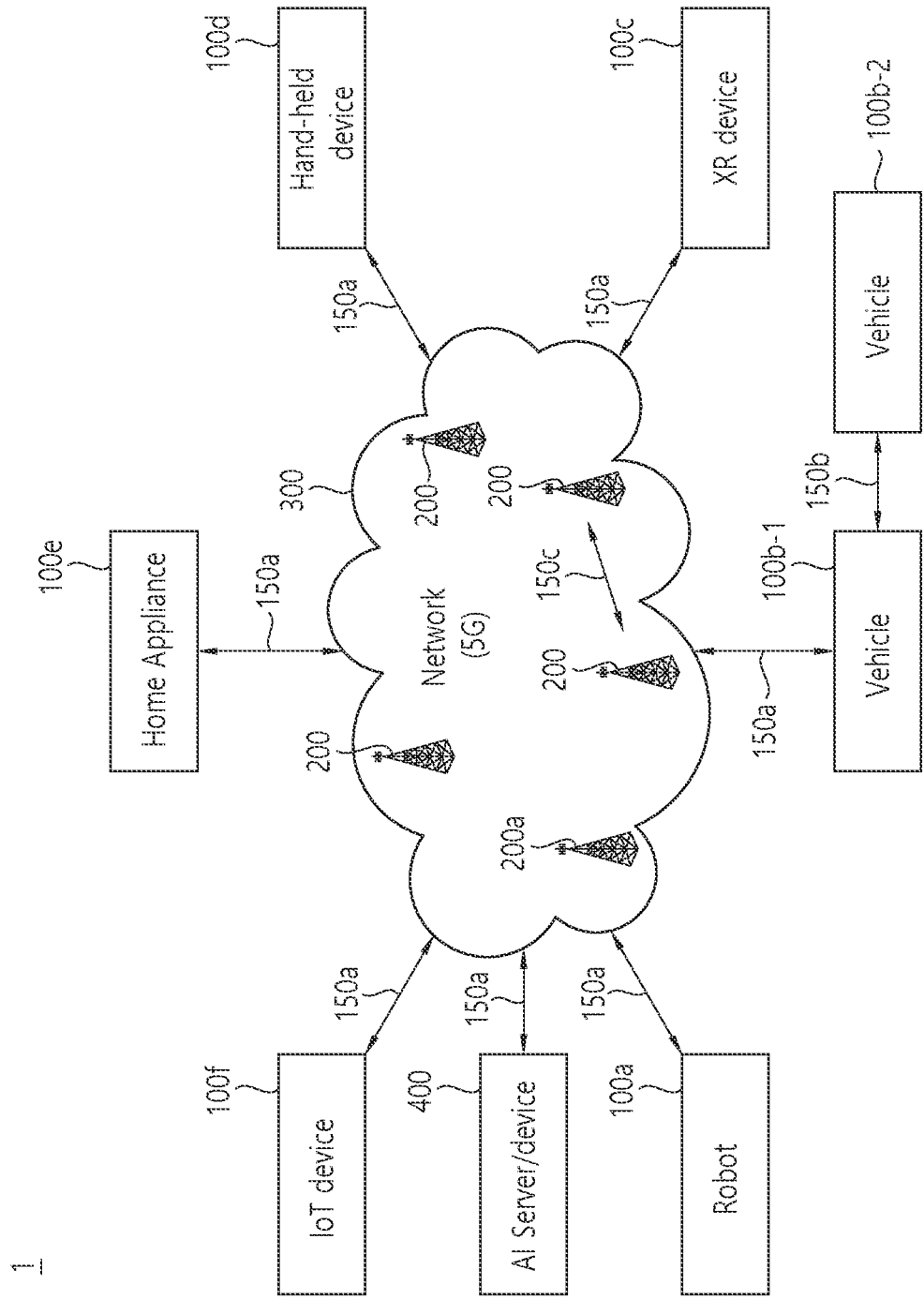
FIG. 1 shows an example of a communication system to which implementations of the present disclosure is applied.

DESCRIPTION OF EXEMPLARY
EMBODIMENTS

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, 5G NR (new radio) and/or 5G Advanced.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
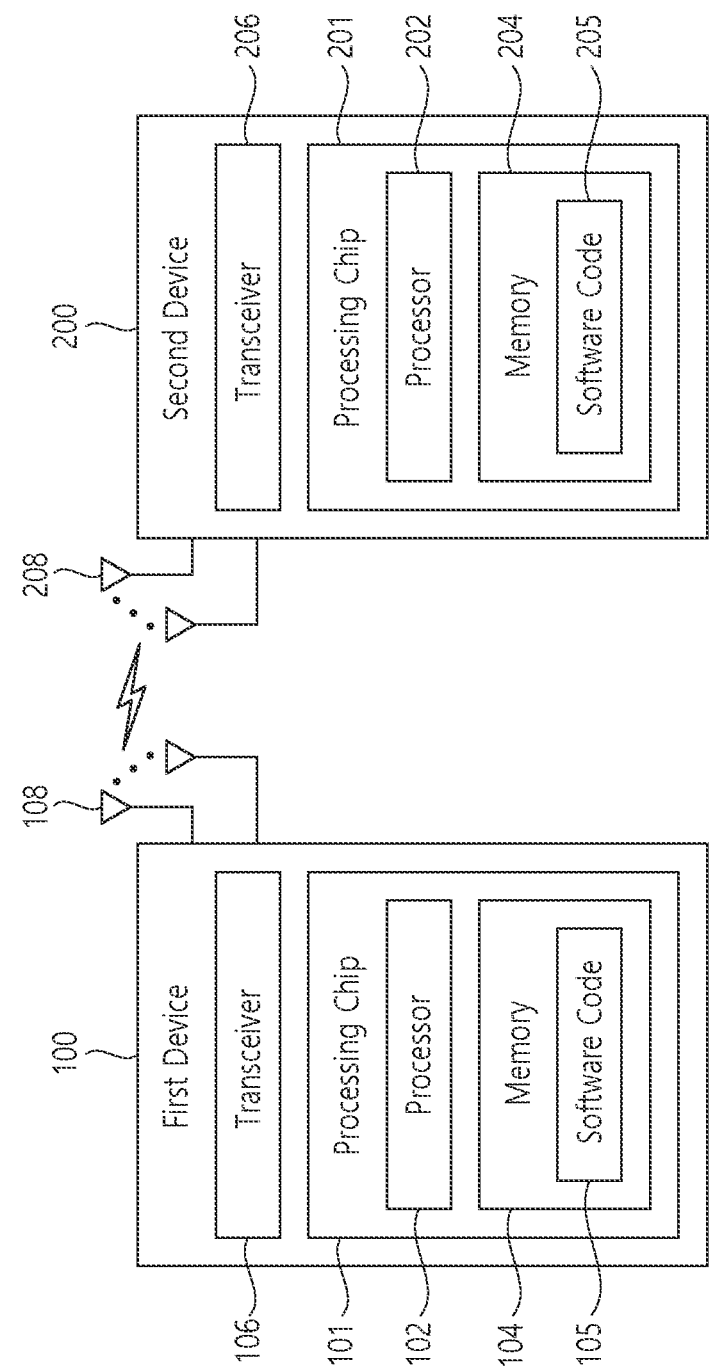
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
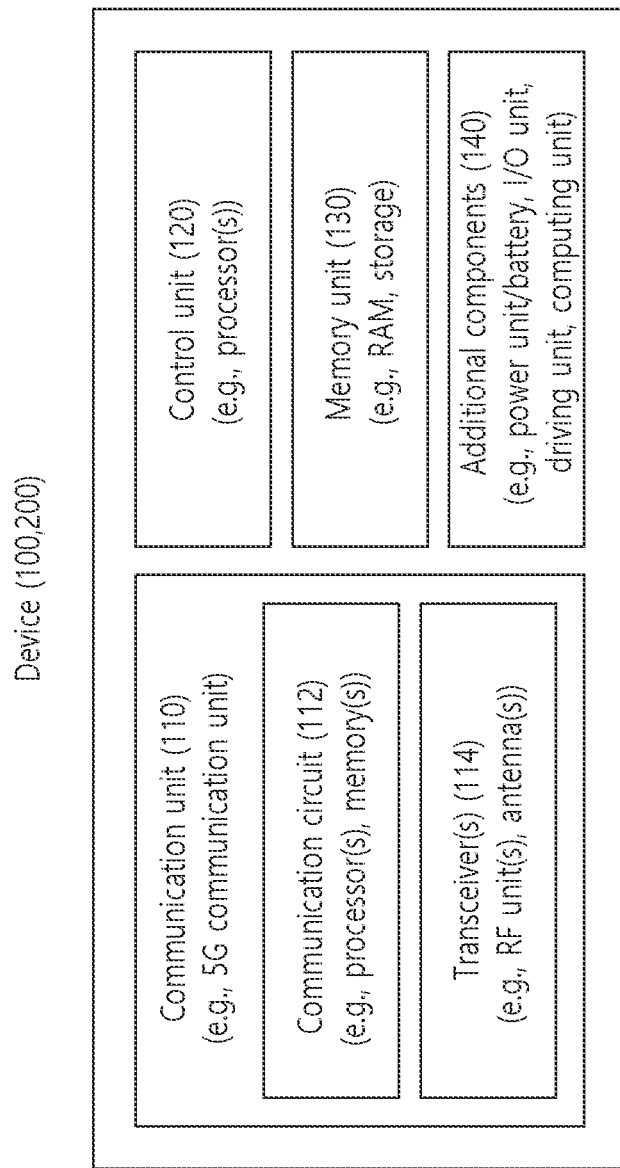
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
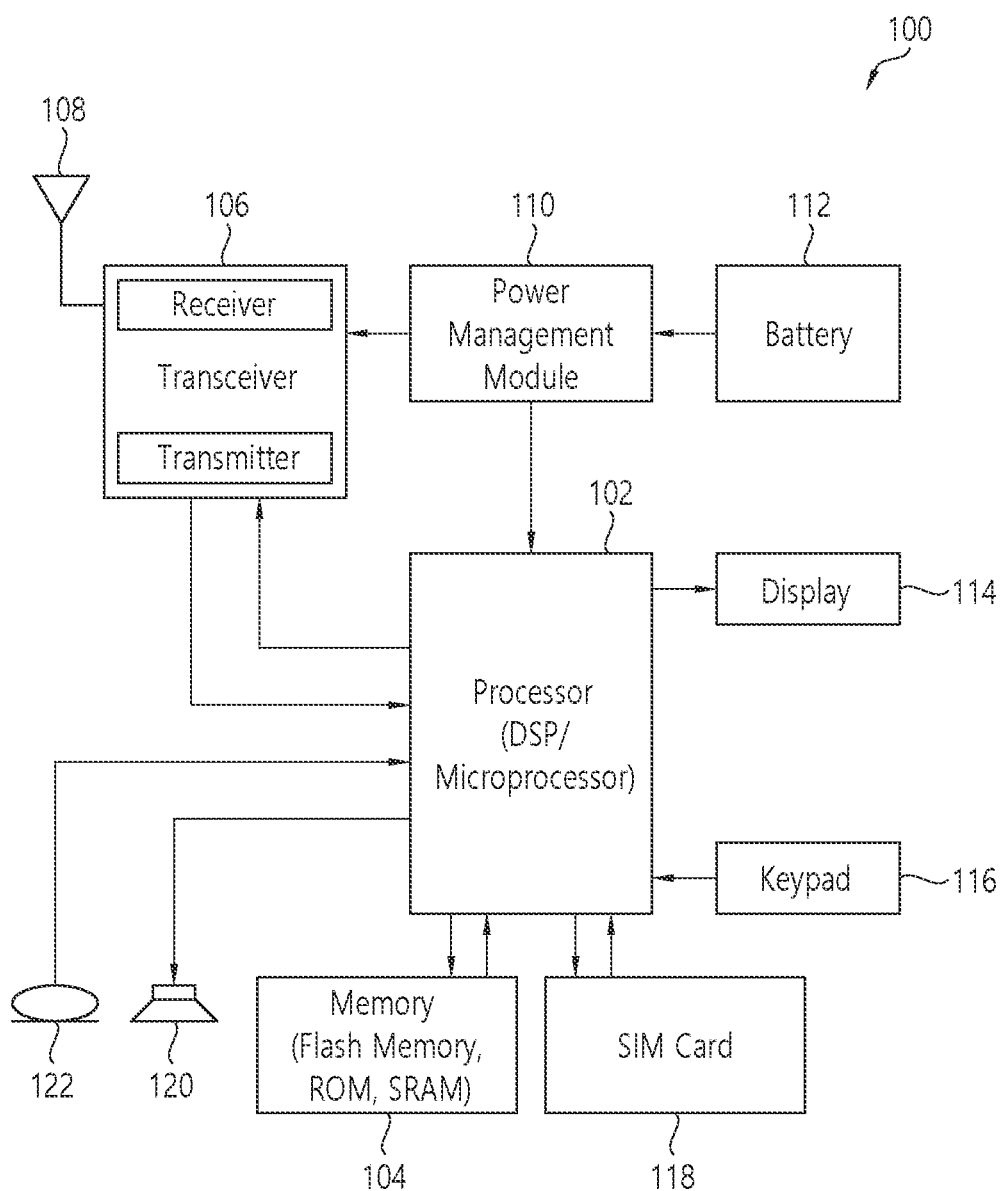
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS' series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Mobile networks may be subscription-centric, which allows mobile operators to protect the access to the network and respect legal obligations. This may be sufficient in times when a user typically only had one phone with one subscription, using only a few services provided by the operator such as telephony and SMS.

However, a person may have different kinds of devices (phones, tablets, laptops), some of which might belong to the user, others might be shared with someone else or belong to some other party to access various operators and non-operator services. Things are increasingly connected (sensors, gateways, actuators etc.) and there may be many different flavours in the relation between the owner of the thing, the holder of the subscription and/or the actual user of the thing.

For example, each service may require its own authentication, often based on username and password. For users it becomes more and more cumbersome to manage the different credentials of the growing number of services.

So-called identity providers address the above problem by providing identity information to entities and authentication to services for those entities. Such mechanisms could be used over the top of any data connections, but integration or interworking with operator networks may provide additional advantages.

Identifying the user in the operator network (by means of an identity provided by some external party or the operator) may enable to provide an enhanced user experience and optimized performance as well as to offer services to devices that are not part of $3^{rd}$ generation partnership project (3GPP) network. The user to be identified could be an individual human user, using a UE with a certain subscription, or an application running on or connecting via the UE, or a device ("thing") behind a gateway UE.

Network settings can be adapted and services offered to users according to their needs, independent of the subscription that is used to establish the connection. By acting as an identity provider, the operator can take additional information from the network into account to provide a higher level of security for the authentication of a user.

In the context of identity management, something outside a system that needs to be identified in the system may be referred to as "entity". In 3GPP, such an entity may be called a user. A user may not be necessarily a person. The user could also be an application or a device ("thing").

Figure 5:
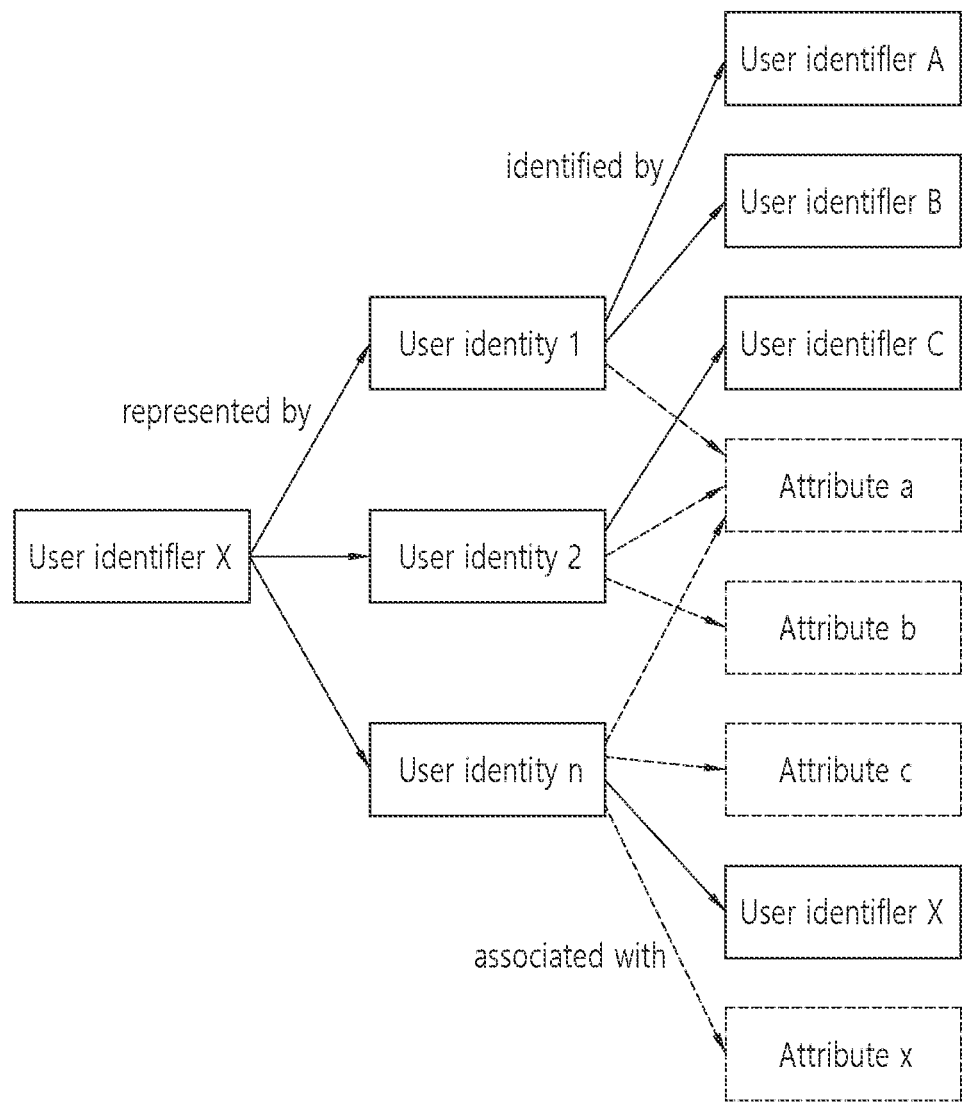
FIG. 5 shows an example of a relation between user, identities, identifiers and attributes to which implementations of the present disclosure is applied.

FIG. 5 shows an example of a relation between user, identities, identifiers and attributes to which implementations of the present disclosure is applied.

Referring to FIG. 5, the entity may be uniquely represented by an identity in the system. The identity can be dependent on the role of the entity in the system (e.g., which kind of service is used for which purpose). As such, a user can have several user identities. For example, one user identity may represent a professional role of the (human) user and another one may represent some aspects of his/her private life. There may be a 1:n relation between user and user identity.

A user identity may be associated with some pieces of information, which are generally called attributes. One special form of attributes may be identifiers. The relation between identity and identifier may be 1:n.

Each user identity may be identified in the system by one or more user identifiers. An identifier could take the form of a network access identifier (NAI), email address or some number, could be permanent (comparable to an international mobile subscriber identity (IMSI)), or temporary (comparable to a temporary mobile subscriber identity (TMSI)).

For example, in the internet-world, a user might choose to use his/her company email address when registering and using services (access to web portals) that the user needs for his/her work. For access to other sites (e.g., online shopping or login to information servers concerning some hobby), the user might use other email addresses. In this example, the email addresses may be the user identifiers that identify the different identities of the user for certain web services.

Other attributes could contain information about the date of birth of a user, the private address, the company name and address, job title etc. Attributes that are no identifiers may be associated with more than one identity. For example, date of birth might be relevant in the professional as well as in the private context. One identity may be typically associated with several attributes.

With having multiple user accounts, the above information (i.e., user identity(ies), user identifier(s) and/or attribute(s)) may be distributed over multiple servers. An identity provider may create, manage and store this information in one place, authenticate a selected user identity (i.e., verifies a claimed user identity) for a service and provide the result and necessary attributes to the service.

The operators can use existing systems to act as identity providers if the operators wish to do so. The identity provisioning service may not need to be defined within 3GPP. For example, the actual process of identity creation, provisioning, managing and/or authentication may not need to be defined within 3GPP.

For an interaction with such a service with the 3GPP system, the followings may be considered:

How to take a user identity into account for adapting network and operator-deployed service settings (e.g. policies, IMS, Gi-LAN service chain) and for network slice selection;

Support of providing the user identity to external services via the 3GPP network;

Extending 3GPP services to non-3GPP devices that are identified by user identifiers, to enable network and service access by these devices and to make them addressable and reachable from the network; and/or If the operator acts as identity provider, how to improve the level of security or confidence in the identity by taking into account information from the network.

Meanwhile, the advancement of robotics application technology would bring more business opportunity in telecommunication market segments through interdisciplinary and cross-industry collaborations. Some critical communication aspect of industrial robots in the context of cyber-physical control systems has been studied so that important use cases, including those with human-machine interface (HMI), can properly be supported with a higher level of communication availability, reliability, time synchronicity and so on. As a result, the related requirements have been identified in three typical traffic classes or communication patterns in industrial environments (refer to 3GPP TS 22.104).

Figure 6:
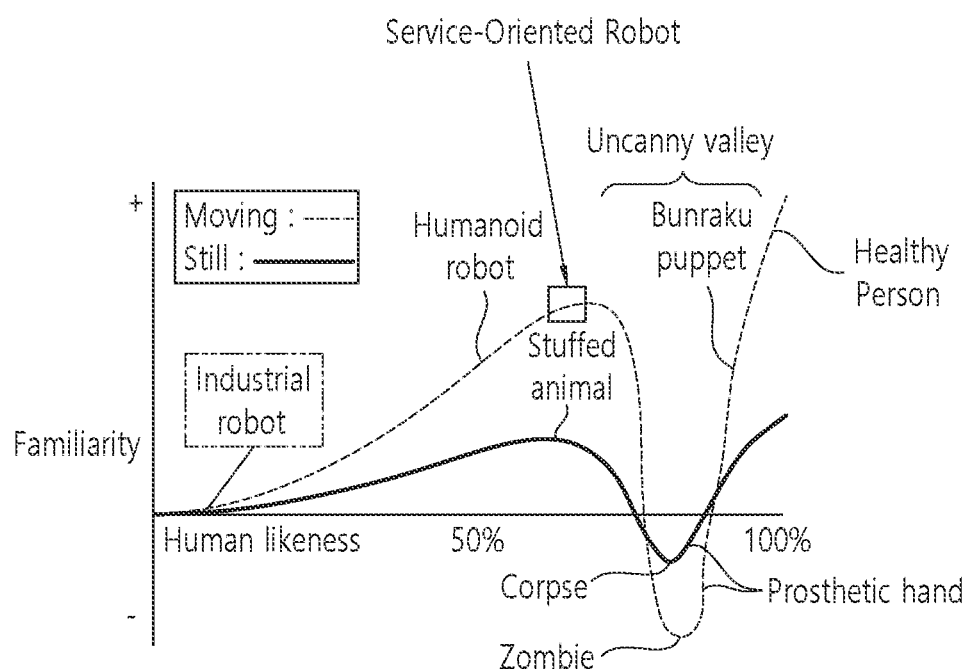
FIG. 6 shows a simplified graphical illustration on a relation between human likeness and familiarity with so-called uncanny valley to which implementations of the present disclosure is applied.

FIG. 6 shows a simplified graphical illustration on a relation between human likeness and familiarity with so-called uncanny valley to which implementations of the present disclosure is applied.

Referring to FIG. 6, a conjectural graphical illustration of so-called uncanny valley of a humanoid robot or robot-looking things (still or moving objects) followed by Mori's conjecture, is provided.

Robotic and animated characters grow ever closer to being indistinguishable from living humanity. Take psychological research, for example: If androids can pass a Turing test, the androids could be used to test subjects' reactions to various human conditions. Yet unlike real people, features and behaviours could be controlled for iterative experiments, and reactions to the androids could be tested in a consistent way.

Following a newly coined term of cloud robotics, a broadly defined concept of cloud robot and the related characteristics may be defined. Cloud robot and automation systems can be broadly defined as follows: Any robot or automation system that relies on either data or code from a network to support its operation, i.e., where not all sensing, computation, and memory are integrated into a single standalone system. The definition is intended to include future systems and many existing systems that involve networked teleoperation or networked groups of mobile robots such as unmanned aerial vehicles (UAVs), or warehouse robots as well as advanced assembly lines, processing plants, and home automation systems, and systems with computation performed by humans. Due to network latency, variable quality of service, and downtime, cloud robot and automation systems may include some capacity for local processing for low-latency responses and during periods where network access is unavailable or unreliable. The definition may not be a binary definition—that is, there may be degrees to which any system will fit under the definition.

There is a growing demand in consumer electronics segments that expects a great deal of roles that service-oriented robots (or service robots) should play in order to improve the level/quality of a human user's daily behaviours for, such as shopping, traveling and more to come upon us resulting from smart-living innovations. Some examples of service-oriented robots may potentially include:

(1) "Serving robot" that is designed to deliver food and beverage to residents of Continuing Care Retirement Community (CCRC), guests of hotels and visitors to airport lounges quickly and efficiently;

(2) "Porter robot" that is designed to help minimize inconvenience for travellers by reducing slow service and long wait times. The porter robot can also facilitate express check-in and check-out service by handling payment and delivering luggage to a waiting vehicle in a fraction of the time; and/or (3) "Shopping cart robot" that is designed to help customers get necessary information and get "hands free" while shopping.

The characteristics and required roles of service-oriented robots to play may be, in general, different from those of industrial robots in terms of:

(1) Application

The service-oriented robots may be applied to assist human, whereas the industrial robots may be applied to replace human/worker's role.

(2) Target Interacting Points

The target interacting points of service-oriented robots may be human users, whereas the target interacting points of industrial robots may be (human) worker in job site operation.

(3) Target Customers

The service-oriented robots may target service-oriented retailers and/or (human) customers, whereas the industrial robots may target manufacturing and/or enterprise.

(4) Technology Readiness

The service-oriented robots may be mature but need continuous evolution, whereas the industrial robots may be more matured.

The service-oriented robots may have both "independent roles" that the service-oriented robots should play respectively and "cooperative roles" that a group of the service-oriented robots should work and play together in coordination. Different from industrial robots or ordinary UEs (e.g., handsets), a service-oriented robot as a UE motivated to work on will be considered to have particular features of communication support in order to play "cooperative roles" and "independent roles" specific to various use case scenarios. The service-oriented robots may be typically capable of moving autonomously, continuing to assist the target customer in the relevant range of proximity. Upon automated recognition of user input/request (typically via HMI) or upon decisions on particular actions to take independently or cooperatively, which is out of the scope of 3GPP, the service-oriented robots can initiate, hold, terminate a communication per particular task and can perform autonomic and regulated communication with their cooperative partner robots.

A service-oriented robot can take multiple tasks from multiple customers, performing a task at a time or multiple tasks in parallel (e.g., one in foreground and others in background wherever possible). Customers normally don't have to own the device/robot or hold the subscription of mobile communication services that the robot currently uses but instead, multiple customers share a robot at the service site such as in/at CCRC/restaurant/shopping mall. It needs to be considered whether the currently defined multi-device (MuD) multi-identity (MiD) requirements are sufficient to support autonomic and regulated communication between service-oriented robots. The present MiD support requirements and user-centric identification and authentication (UIA) requirements may not explicitly allow a device to be used by more than one customer (with their identities) at the same time. By investigating different use case scenarios, it will be handled if it is necessary to introduce new requirements to explicitly allow a device (robot) used by multiple customers with their identities at the same time (e.g., one in foreground and others in background).

For example, due to the nature of robot's physical movement that causes the most significant energy consumption, a robot may be designed to be able to serve multiple customers, if needed, for a subset of a moving path from origin A to destination B. Porter robot carrying multiple bags of multiple customers which intends to make a single path trip may utilize overlapped segment of a path, instead of making multiple trips.

The current user centric identity and authentication (UIA) requirements and Multi-device Multi-identity (MiD/MuD) requirements do not cover the case where a UE is servicing multiple customers/users at the same time.

To achieve better utilization of robots, it is necessary to design them to be able to service multiple customers whenever authorized and available to do so. For example, the transport layer should be able to provide distinction among multiple sessions with the respective user/customer identity ensured. Without the respective user/customer identity ensured, a security problem (e.g., in terms of authentication, non-repudiation, accounting, billing) may arise.

Let's consider a scenario in which a robot UE starts serving a customer 1, and while the serving of the customer 1 by the robot UE is in progress, the robot UE starts serving customer 2. For the scenario, there may be two cases case 1 and case 2:

Case 1) Customer 1 doesn't want to wait until his/her job committed to the robot UE is completed; and Case 2) Customer 1 doesn't have to wait.

In both cases, if there is a customer, say customer 2, or more, then the robot UE can be utilized instead of continuing to stay occupied by customer 1. In such cases, a robot can serve two customers at the same time during a certain period of time. A generalization can be made such that a robot serve N (N>=2) customers at the same time during a certain period of time.

Figure 7:
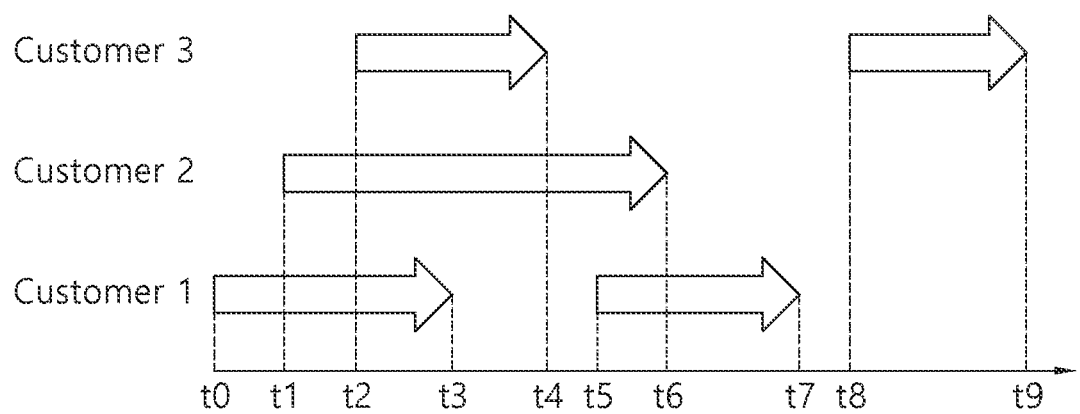
FIG. 7 shows an example of performing tasks for multiple customer according to an embodiment of the present disclosure.

FIG. 7 shows an example of performing tasks for multiple customer according to an embodiment of the present disclosure.

Referring to FIG. 7, a robot UE may initiate to perform a first task for customer 1 at a start time t0. The first task for customer 1 may last until time t3. Therefore, a duration of the first task for customer 1 may be (t3−t0).

While the first task for customer 1 is in progress after the time t0, the robot UE may initiate to perform a task for customer 2 at start time t1. The first task for customer 1 may last until time t6. Therefore, a duration of the task for customer 2 may be (t6−t1).

While the first task for customer 1 and the task for customer 2 are in progress after the time t1, the robot UE may initiate to perform a first task for customer 3 at a start time t2. The first task for customer 3 may last until t4. Therefore, a duration of the first task for customer 3 may be (t4−t2).

During a time interval from t0 to t1 and a time interval from t4 to t5, the robot UE may perform only a single task (i.e., the first task for customer 1 or the task for customer 2) at the same time.

During a time interval from t1 to t2 and a time interval from t3 to t4, the robot UE may perform 2 tasks (i.e., the first task for customer 1 and the task for customer 2) at the same time.

During a time interval from t2 to t t3, the robot UE may perform 3 tasks (i.e., the first task for customer 1, the task for customer 2 and the first task for customer 3) at the same time.

While the task for customer 2 is in progress after the time t4, the robot UE may initiate to perform a second task for customer 1 at a start time t5. The second task for customer 1 may last until t7. Therefore, a duration of the second task for customer 1 may be (t7−t5).

During a time interval from t6 to t7, the robot UE may perform only a single task (i.e., the second task for customer 1) at the same time.

During a time interval from t5 to t6, the robot UE may perform 2 tasks (i.e., the task for customer 2 and the second task for customer 1) at the same time.

The first task for customer 1 and the second task for customer 1 may be associated with a same type of task, or a different type of task.

After the time t7, the robot UE may initiate to perform a second task for customer 3 at a start time t8, while no tasks are in progress in the robot UE. The second task for customer 3 may last until t9. Therefore, a duration of the second task for customer 3 may be (t9−t8). During a time interval from t8 to t9, the robot UE may perform only a single task (i.e., the second task for customer 3) at the same time without performing any other tasks.

3GPP system shall be able to provide a means to make a separate charging information on the respective customers based on their type of subscription (through the robot UE or through their account subscription to a mobile network operator (MNO)), amount of traffic usage, even when a robot UE is used by multiple customers during a certain period of time.

Depending on the types of service scenarios such as indoor delivery and CCRC, some scenarios may not require user/customer identity (or identifier) whereas other scenarios may require user/customer identity (or identifier).

In various embodiments of the present disclosure, the local robot operator (a third party to MNO) shall be able to configure that a robot under operation and control of the local robot operator can service only one customer at a time or can serve multiple customers at a time (e.g., one in foreground and the others in background).

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 8:
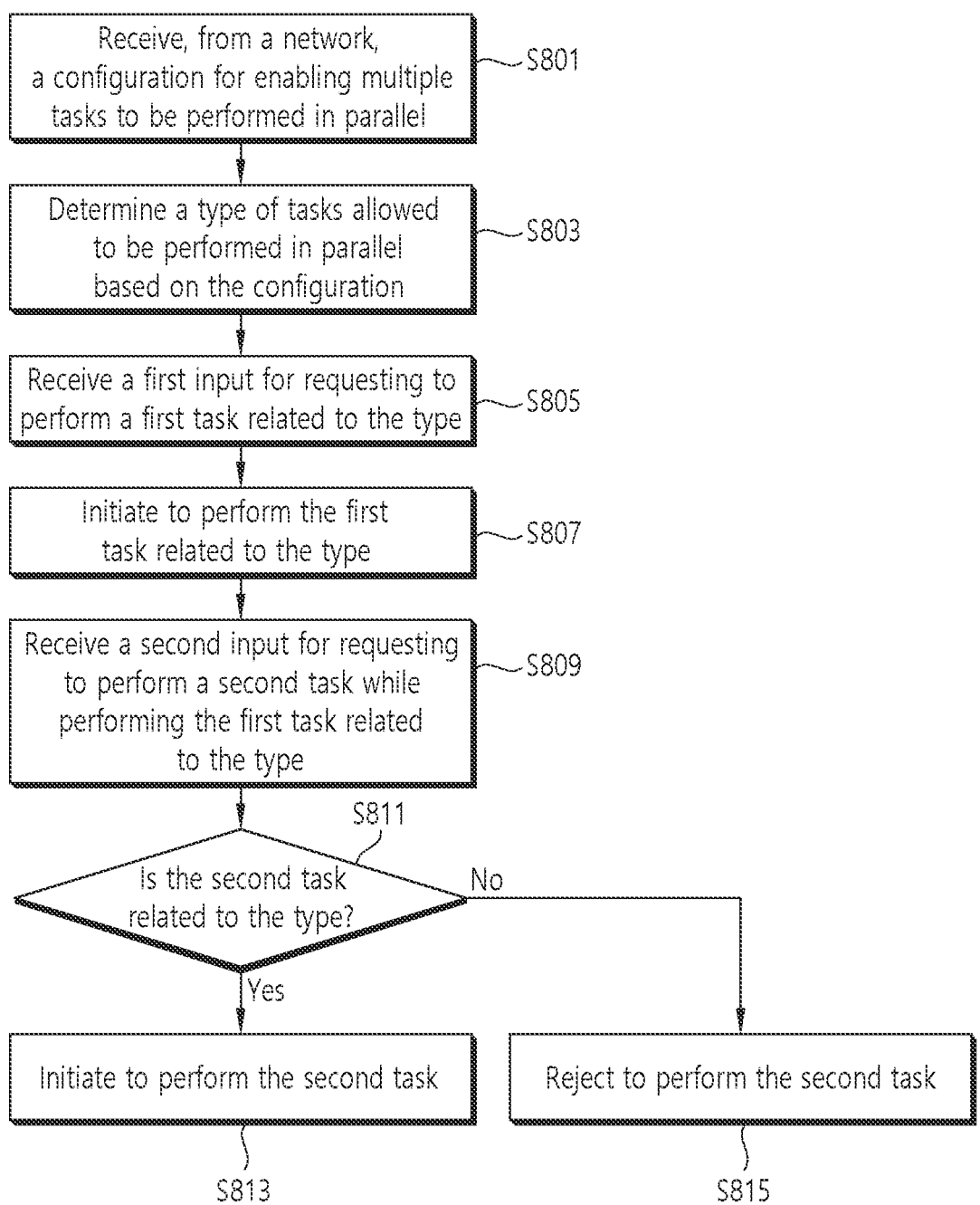
FIG. 8 shows an example of a method for controlling to perform multiple tasks in parallel according to an embodiment of the present disclosure.

FIG. 8 shows an example of a method for controlling to perform multiple tasks in parallel according to an embodiment of the present disclosure. Steps illustrated in FIG. 8 may be performed by a device, robot and/or UE including a robot UE.

Referring to FIG. 8, in step S801, the device may receive, from a network, a configuration for enabling multiple tasks to be performed in parallel.

In step S803, the device may determine a type of tasks allowed to be performed in parallel based on the configuration.

In step S805, the device may receive a first input for requesting to perform a first task related to the type. The first input may be related to a first user identity.

In step S807, the device may initiate to perform the first task related to the type.

In step S809, the device may receive a second input for requesting to perform a second task while performing the first task related to the type. The second input may be related to a second user identity.

In step S811, the device may determine whether the second task is related to the type. If the second task is related to the type, in step S813, the device may initiate to perform the second task. On the other hand, if the second task is related to a different type, in step S815, the device may reject to perform the second task.

The device may determine a start time and a duration based on the configuration.

In an example, the start time may be a time at which the configuration is started to be applied. The duration may be a time period during which the configuration is to be applied.

In another example, the start time may comprise a time epoch at or after which each task is allowed to get started by the robot. The duration may be a time period during which each task is allowed to be to be performed by the robot. The configuration may comprise a mode of operation set to a committed mode. The configuration may comprise at least one of the start time, the duration or the type of tasks.

The configuration may comprise a mode of operation set to an automated mode. At least one of the start time, the duration or the type of tasks may be autonomously determined by the device.

The device may transmit, to the network, a configuration response for the configuration. The configuration response may comprise at least one of the start time, the duration or the type of tasks.

The configuration may comprise a maximum number of distinct tasks allowed to be performed in parallel. The distinct tasks may be related to different user identities.

The maximum number of distinct tasks allowed to be performed in parallel may correspond to multiple types of tasks, or each of the multiple types of tasks. For example, multiple types of tasks may comprise a type of task in which a robot is allowed to deliver luggage of multiple customers from concierge to a waiting vehicle but is not allowed to deliver luggage of customers from the front desk to their hotel rooms, depending on the particular need that the robot user or robot service operator may have.

The device may present (e.g., display or make an audio sound to inform) at least one of whether any tasks are in progress in the device, the type of tasks allowed to be performed in parallel, or whether performing a task related to the type is allowed to be further accommodated by the device.

The time information including at least one of the start time or the duration may be synchronized based on a global reference time clock or a local reference time clock. Based on that the global reference time clock and the local reference time clock are compromised, tasks in progress in the device may be stopped.

The device may comprise a robot user equipment (UE). The robot UE may be in communication with at least one of a UE, a network, or autonomous vehicles other than the wireless device.

Figure 9:
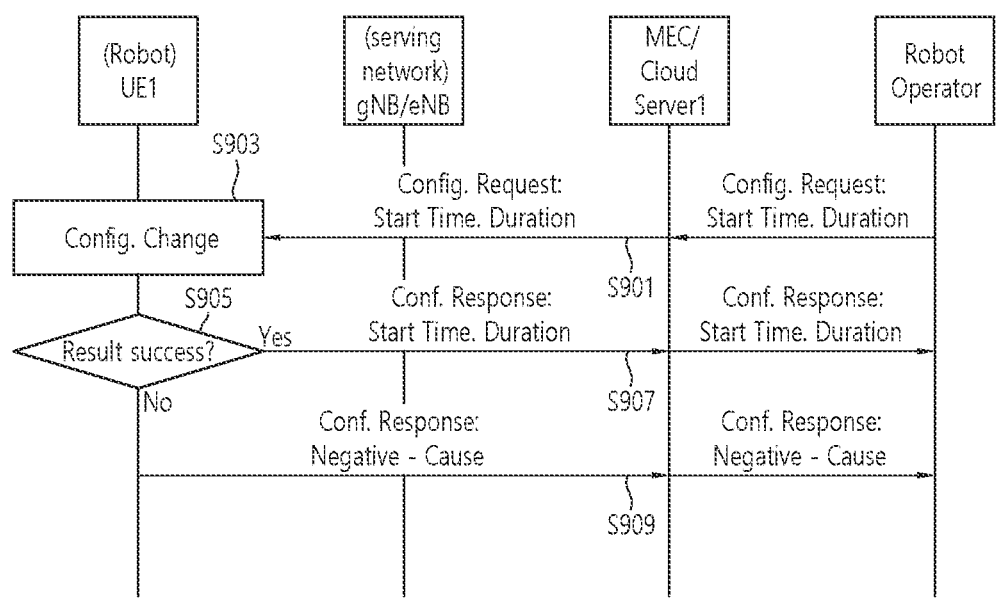
FIG. 9 shows an example of a signal flow for providing a configuration related to performing multiple tasks according to an embodiment of the present disclosure.

FIG. 9 shows an example of a signal flow for providing a configuration related to performing multiple tasks according to an embodiment of the present disclosure.

Referring to FIG. 9, in step S901, a robot UE (which is a robot and/or UE) may receive a configuration/configuration request message for enabling multiple tasks to be performed in parallel (i.e., configuration for multiple customer support operation). For example, robot operator may transmit the configuration/configuration request message to MEC/cloud server 1, and the MEC/cloud server 1 may forward the configuration/configuration request message to the robot UE via a serving radio access network (i.e., gNB/eNB).

The configuration and/or configuration request message may include at least one of type/mode of operation or the maximum number of distinct customers (i.e., the maximum number of distinct tasks that can be performed in parallel by the robot UE. Herein, the distinct tasks may be related to different user identities.).

The type/mode of operation may comprise at least one of automated type/mode of operation, or committed type/mode of operation.

If the configuration and/or configuration request message includes a type/mode of operation set to committed mode, the configuration and/or configuration request message further includes at least one of a start time (global reference time clock or local reference time clock can be used), duration, a type of tasks for multiple customer support operation (i.e., type of tasks allowed to be performed in parallel). The type of tasks for multiple customer support operation may be pre-defined and can be identified when a robot and a next customer are trying to negotiate whether to start a task for the next customer or not. For example, if type A task is only included in the configuration for multiple customer support operation, a type B task requested by a next customer will not be accommodated in the robot UE although multiple customer operation is configured and enabled (i.e., performing multiple tasks in parallel is configured and enabled). If the type of tasks for multiple customer support operation is pre-defined, the type of tasks for multiple customer support operation may not be included in the configuration although the configuration includes a type/mode of operation set to committed mode.

In an example, the start time may be a time at which the configuration is started to be applied, and the duration may be a time period during which the configuration is to be applied.

In another example, the start time may be a time at which each task is started to be performed, and the duration may be a time period during which each task is to be performed.

When defining and instructing the maximum number of distinct customers, the maximum number of distinct customers can be a single number not distinguishing different types of tasks (i.e., the maximum number of distinct customers can be a single number defined for multiple types of tasks) or the maximum number of distinct customers can be multiple numbers for the respective defined types of tasks (i.e., the maximum number of distinct customers can be multiple numbers each of which is defined for each of the multiple types of tasks). For example, if task type A is the only type that is allowed for multiple customer support operation, there would be a single number indicating the maximum number of distinct customers. On the other scenario, if multiple task types are allowed for multiple customer support operation (e.g., task type A and task type B), there would be more than one number indicating the maximum number of distinct customers. For example, one number may be defined for indicating the maximum number of distinct customers requesting type A task and the other number may be defined for another maximum number of distinct customers requesting type B tasks for the robot UE to service. For another example, only a single number may be defined for indicating the maximum number of distinct customers requesting type A task and distinct customers requesting type B task.

In step S903, the robot UE may attempt to apply/enable the received configuration. If there is existing configuration stored in robot UE, the robot UE may attempt to change the existing configuration for the configuration received in step S901.

In step 905, the robot UE may determine whether the attempt in step S903 results in success or not. If the result is successful, the robot UE will enable/apply the configuration and, in step S907, send a configuration response to the robot operator. The configuration may be enabled/applied at the start time and will be active for the designated period of time (i.e., duration), if defined. On the other hand, if the result is not successful, in step S909, the robot UE may send a negative configuration response with cause information included, if available.

In steps S907 and S909, the robot UE may transmit the configuration response to the MEC/cloud server 1 via the radio access network, and the MEC/cloud server 1 may forward the configuration response to the robot operator.

If the configuration/configuration request message received in step S901 includes a type/mode of operation set to automated mode, the robot UE may set up the start time and/or the duration on its own and include information for the start time and/or the duration in the configuration response, when attempt to enable/apply the configuration is successful.

The automated mode of operation will enable the robot UE to determine whether or not to accommodate multiple tasks from a single customer and/or multiple tasks from multiple distinct customers at the same time on its own. However, in committed mode of operation, the robot UE will only follow the instructed, configured or allowed actions for multiple customer support operation. e.g., for which types of tasks the robot UE will allow/accommodate a new customer, doing so starting from what time, ending the multiple customer support operations by what time, if designated in the committed mode of operation.

The configuration request in step S901, the result of attempt to apply/enable the received configuration in step S905 and the configuration response in step S905 and/or S907 can be recorded and stored in proof-of-work (POW) in distributed ledger technology (DLT) based ledger(s).

If a generation of an information item (or called a "block" in blockchain) is made following the same precedent information item (or "precedent block") by a robot UE or by a robot operator while another generation of an information item (or called a "block") is being performed, one of such information items (or "blocks") shall become a legitimate "information item" (or block) and the rest shall be considered a "orphaned" information item (or called "orphaned block"), respectively, which can be rearranged to be a successor of the legitimated "information item" (or block).

If a robot UE is configured and enabled multiple customer support operations (i.e., if the robot UE is configured and/or enabled to perform multiple tasks in parallel), the robot UE can provide an audio and/or visual display for (or other means of indications for) a next customer. The display or indication will allow a next customer to know if the robot UE is being occupied and not accommodating any other new (or a certain type of) task.

The 3GPP system shall support to authenticate a user identity to a service with a user identifier through a UE even when a communication function of the UE (e.g., UE relay (a robot for a customer's UE), or a UE (a robot) servicing a user/customer (without their own UEs)) is being used by another user. The maximum number (or numbers) of multiple distinct customers/users that can be accommodated by the UE (robot UE) may be described in the steps above.

The current 3GPP specification (TS 22.101 v17.1.0) defines a requirement as follows: "The 3GPP System shall support to authenticate a user identity to a service with a user identifier" with a note of "The requirement applies to 3GPP services and non-3GPP services that are accessed via the 3GPP System"

Figure 10:
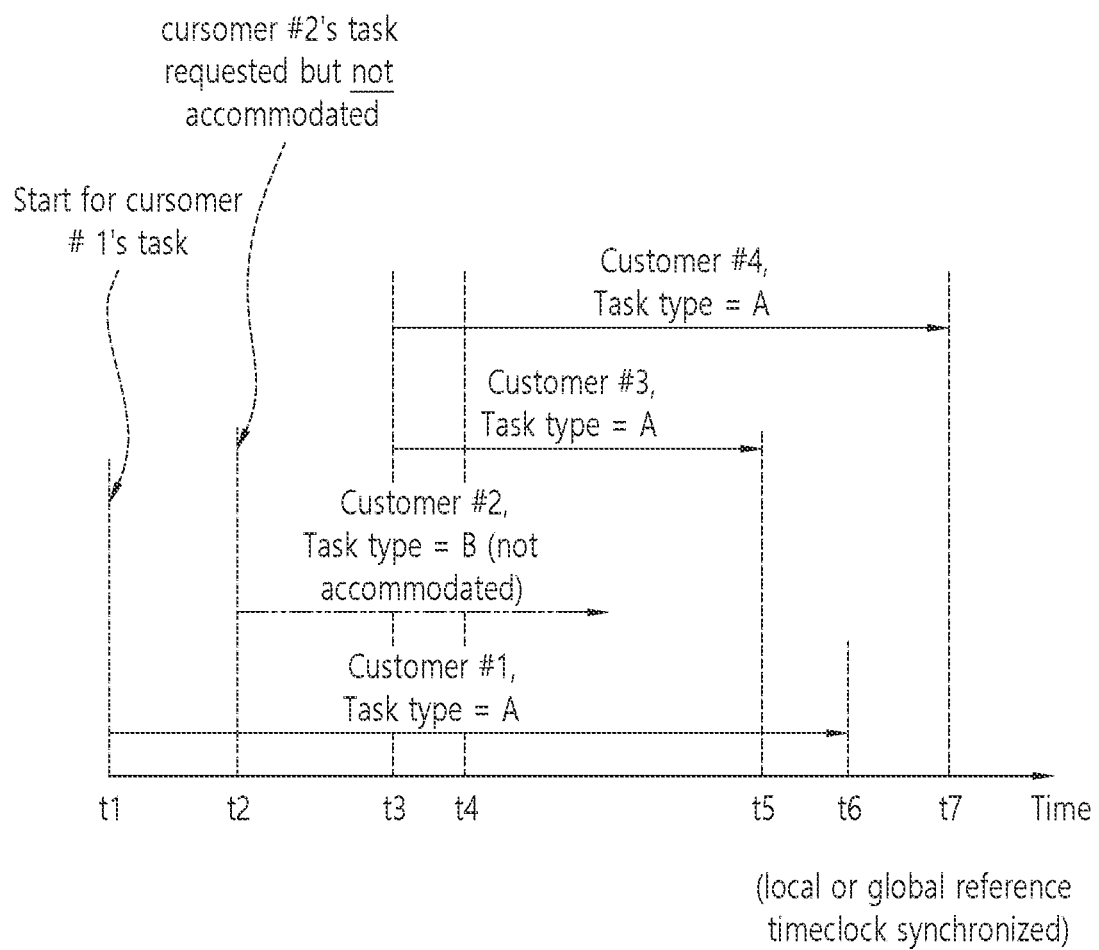
FIG. 10 shows an example of multiple customer support operations for a robot UE in a time domain.

FIG. 10 shows an example of multiple customer support operations for a robot UE in a time domain. In FIG. 10, it is assumed that only task type A is included in the configuration for multiple customer support operation.

Referring to FIG. 10, a robot UE may receive a request to perform a task for customer #1 of which task type is A. Therefore, the robot UE may start the task for customer #1 at start time t1, upon receiving the request to perform the task for customer #1. The task for customer #1 may last until time t6. Therefore, the duration of the task for customer #1 may be (t6–t1).

While the task for customer #1 is in progress, the robot UE may receive a request to perform a task for customer #2. Since a task type of the task for customer #2 is B, the robot UE does not accommodate the task for customer #2, and does not start the task for customer #2.

While the task for customer #1 is in progress, the robot UE may receive a request to perform a task for customer #3 of which task type is A. Therefore, the robot UE may start the task for customer #3 at start time t3, upon receiving the request to perform the task for customer #3. The task for customer #3 may last until time t5. Therefore, the duration of the task for customer #3 may be (t5–t3).

While the tasks for customer #1 and #3 are in progress, the robot UE may receive a request to perform a task for customer #4 of which task type is A. Therefore, the robot UE may start the task for customer #4 at start time t4, upon receiving the request to perform the task for customer #4. The task for customer #4 may last until t7. Therefore, the duration of the task for customer #4 may be (t7–t4).

In a committed mode, the start time(s) and the duration(s) may be included in the configuration for multiple customer support operation.

In an automated mode, the robot UE may autonomously determine the start time(s) and the duration(s), based on the configuration for multiple customer support operation.

In FIG. 10, in an example, two methods for time clock synchronization can be used. One method may be based on 5GS synchronization (e.g., the one used for NG RAN clock synchronization which is specified in 3GPP TS38.331), and the other method may be time sensitive network or networking (TSN) based solutions, using IEEE 802.1AS. 5GS based synchronization can be considered 5G internal.

In other example, a global reference time clock and/or a local reference time clock can be used. If the global reference time clock and the local reference time clock are compromised, the robot UE may stop the tasks in progress.

Hereinafter, benefits of the multiple customer support operation (i.e., the operation in which performing multiple tasks in parallel is enabled) is described.

To analyse the average waiting time when a fixed number of robot UEs are available with and without multiple customer support operations enabled, an M/Mc queue model will be used. It can be considered in the analysis that there is a single type of task.

In specific, the followings are assumed in the waiting time analysis:

Queuing model: M/M/c model;
Number of customers=100;
Task generation rate per customer=0.25 tasks per hour;
Task processing/completion rate per robot=1 task per hour; and
Maximum number of multiple customers accommodated=2 tasks per robot UE, 4 tasks per robot UE.

The average waiting time analysis results are described in table 3 below:

TABLE 3

| Number of robot UE's | No multi-customer support | With multi-customer support (approximation), 2 tasks/robot UE | With multi-customer support (approximation), 4 tasks/robot UE |
|---|---|---|---|
| 7 | infinite | infinite | 1.936 |
| 8 | infinite | infinite | 1.239 |
| 10 | infinite | infinite | 1.034 |
| 13 | infinite | 2.69 | 1.002 |
| 14 | infinite | 1.394 | 1 |
| 15 | infinite | 1.161 | 1 |
| 20 | infinite | 1.005 | 1 |
| 25 | infinite | 1 | 1 |
| 26 | 1.78 | 1 | 1 |
| 27 | 1.30 | 1 | 1 |

The analysis result shows that the multi-customer support operations require a reduced number of robots to be operated.

In table 3, if two tasks can be accommodated, the robot operator can provide a better average waiting time (including service time) of 1.394 with 14 robots compared to 26 robots when multi-customer support operation is not supported.

In table 3, if four tasks can be accommodated, the robot operator can provide a better average waiting time (including service time) of 1.394 with 8 robots compared to 26 robots when multi-customer support operation is not supported.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 11:
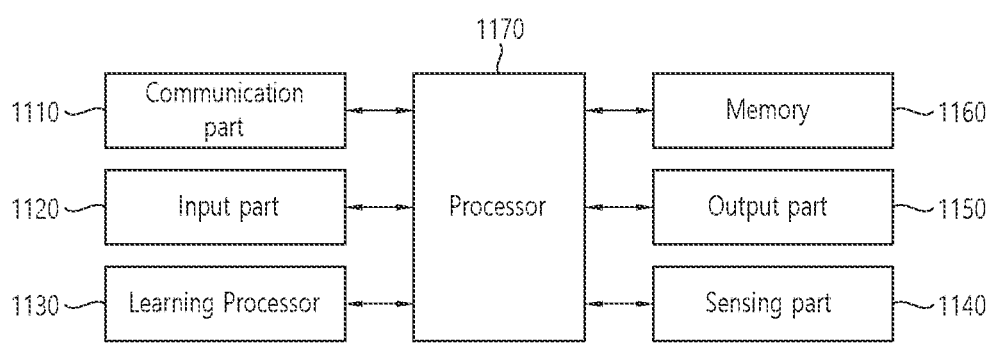
FIG. 11 shows an example of an AI device to which the technical features of the present disclosure can be applied.

FIG. 11 shows an example of an AI device to which the technical features of the present disclosure can be applied.

The AI device 1100 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 11, the AI device 1100 may include a communication part 1110, an input part 1120, a learning processor 1130, a sensing part 1140, an output part 1150, a memory 1120, and a processor 1170.

The communication part 1110 can transmit and/or receive data to and/or from external devices such as the AI devices and the AI server using wire and/or wireless communication technology. For example, the communication part 1110 can transmit and/or receive sensor information, a user input, a learning model, and a control signal with external devices. The communication technology used by the communication part 1110 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1120 can acquire various kinds of data. The input part 1120 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1120 can acquire input data to be used when acquiring an output using learning data and a learning model for model learning. The input part 1120 may obtain raw input data, in which case the processor 1170 or the learning processor 1130 may extract input features by preprocessing the input data.

The learning processor 1130 may learn a model composed of an ANN using learning data. The learned ANN can be referred to as a learning model. The learning model can be used to infer result values for new input data rather than learning data, and the inferred values can be used as a basis for determining which actions to perform. The learning processor 1130 may perform AI processing together with the learning processor of the AI server. The learning processor 1130 may include a memory integrated and/or implemented in the AI device 1100. Alternatively, the learning processor 1130 may be implemented using the memory 1120, an external memory directly coupled to the AI device 1100, and/or a memory maintained in an external device.

The sensing part 1140 may acquire at least one of internal information of the AI device 1100, environment information of the AI device 1100, and/or the user information using various sensors. The sensors included in the sensing part 1140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1150 may generate an output related to visual, auditory, tactile, etc. The output part 1150 may include a display unit for outputting visual information, a speaker for outputting auditory information, and/or a haptic module for outputting tactile information.

The memory 1120 may store data that supports various functions of the AI device 1100. For example, the memory 1120 may store input data acquired by the input part 1120, learning data, a learning model, a learning history, etc.

The processor 1170 may determine at least one executable operation of the AI device 1100 based on information determined and/or generated using a data analysis algorithm and/or a machine learning algorithm. The processor 1170 may then control the components of the AI device 1100 to perform the determined operation. The processor 1170 may request, retrieve, receive, and/or utilize data in the learning processor 1130 and/or the memory 1120, and may control the components of the AI device 1100 to execute the predicted operation and/or the operation determined to be desirable among the at least one executable operation. The processor 1170 may generate a control signal for controlling the external device, and may transmit the generated control signal to the external device, when the external device needs to be linked to perform the determined operation. The processor 1170 may obtain the intention information for the user input and determine the user's requirements based on the obtained intention information. The processor 1170 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1130 and/or learned by the learning processor of the AI server, and/or learned by their distributed processing. The processor 1170 may collect history information including the operation contents of the AI device 1100 and/or the user's feedback on the operation, etc. The processor 1170 may store the collected history information in the memory 1120 and/or the learning processor 1130, and/or transmit to an external device such as the AI server. The collected history information can be used to update the learning model. The processor 1170 may control at least some of the components of AI device 1100 to drive an application program stored in memory 1120. Furthermore, the processor 1170 may operate two or more of the components included in the AI device 1100 in combination with each other for driving the application program.

Figure 12:
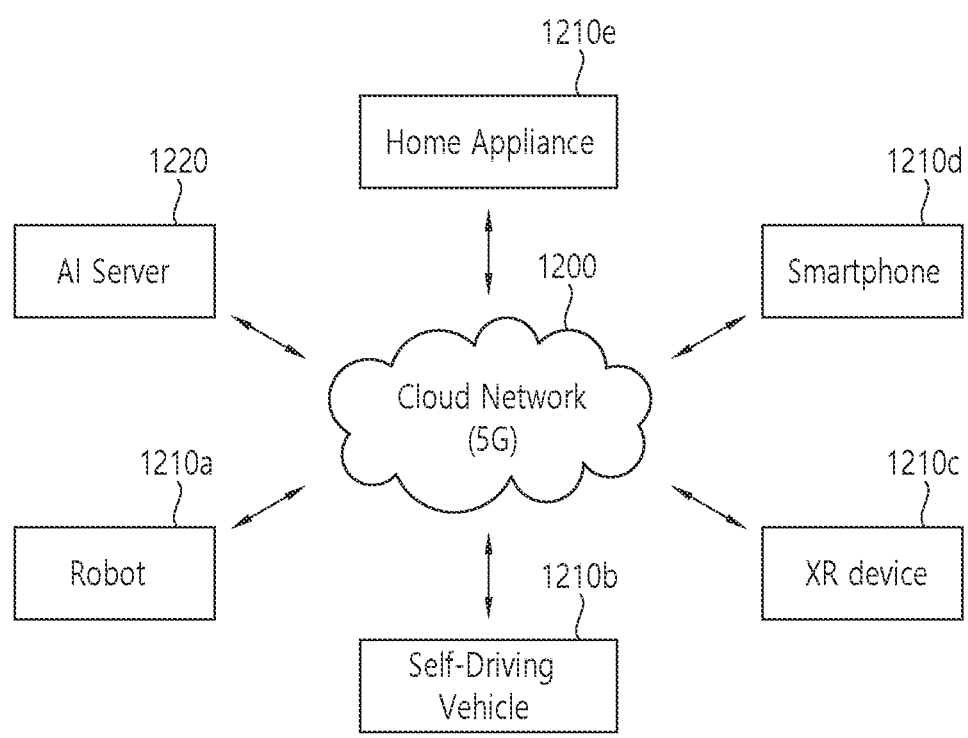
FIG. 12 shows an example of an AI system to which the technical features of the present disclosure can be applied.

FIG. 12 shows an example of an AI system to which the technical features of the present disclosure can be applied.

Referring to FIG. 12, in the AI system, at least one of an AI server 1220, a robot 1210a, an autonomous vehicle 1210b, an XR device 1210c, a smartphone 1210d and/or a home appliance 1210e is connected to a cloud network 1200. The robot 1210a, the autonomous vehicle 1210b, the XR device 1210c, the smartphone 1210d, and/or the home appliance 1210e to which the AI technology is applied may be referred to as AI devices 1210a to 1210e.

The cloud network 1200 may refer to a network that forms part of a cloud computing infrastructure and/or resides in a cloud computing infrastructure. The cloud network 1200 may be configured using a 3G network, a 4G or LTE network, and/or a 5G network. That is, each of the devices 1210a to 1210e and 1220 consisting the AI system may be connected to each other through the cloud network 1200. In particular, each of the devices 1210a to 1210e and 1220 may communicate with each other through a base station, but may directly communicate with each other without using a base station.

The AI server 1220 may include a server for performing AI processing and a server for performing operations on big data. The AI server 1220 is connected to at least one or more of AI devices constituting the AI system, i.e. the robot 1210a, the autonomous vehicle 1210b, the XR device 1210c, the smartphone 1210d and/or the home appliance 1210e through the cloud network 1200, and may assist at least some AI processing of the connected AI devices 1210a to 1210e. The AI server 1220 can learn the ANN according to the machine learning algorithm on behalf of the AI devices 1210a to 1210e, and can directly store the learning models and/or transmit them to the AI devices 1210a to 1210e. The AI server 1220 may receive the input data from the AI devices 1210a to 1210e, infer the result value with respect to the received input data using the learning model, generate a response and/or a control command based on the inferred result value, and transmit the generated data to the AI devices 1210a to 1210e. Alternatively, the AI devices 1210a to 1210e may directly infer a result value for the input data using a learning model, and generate a response and/or a control command based on the inferred result value.

Various embodiments of the AI devices 1210a to 1210e to which the technical features of the present disclosure can be applied will be described. The AI devices 1210a to 1210e shown in FIG. 12 can be seen as specific embodiments of the AI device 1100 shown in FIG. 11.

Hereinafter, an apparatus for a device in a wireless communication system, according to some embodiments of the present disclosure, will be described.

For example, the device may include a transceiver, a memory, and at least one processor operatively coupled to the transceiver and the memory.

The at least one processor may be configured to control the transceiver to receive, from a network, a configuration for enabling multiple tasks to be performed in parallel. The at least one processor may be configured to determine a type of tasks allowed to be performed in parallel based on the configuration. The at least one processor may be configured to receive a first input for requesting to perform a first task related to the type. The first input may be related to a first user identity. The at least one processor may be configured to initiate to perform the first task related to the type. The at least one processor may be configured to receive a second input for requesting to perform a second task while performing the first task related to the type. The second input may be related to a second user identity. Based on that the second task is related to the type, the at least one processor may be configured to initiate to perform the second task. Based on that the second task is related to a different type, the at least one processor may be configured to reject to perform the second task.

The at least one processor may be configured to determine a start time and a duration based on the configuration.

In an example, the start time may be a time at which the configuration is started to be applied. The duration may be a time period during which the configuration is to be applied.

In another example, the start time may be a time at which each task is started to be performed. The duration may be a time period during which each task is to be performed.

The configuration may comprise a mode of operation set to a committed mode. The configuration may comprise at least one of the start time, the duration or the type of tasks.

The configuration may comprise a mode of operation set to an automated mode. At least one of the start time, the duration or the type of tasks may be autonomously determined by the device.

The at least one processor may be configured to transmit, to the network, a configuration response for the configuration. The configuration response may comprise at least one of the start time, the duration or the type of tasks.

The configuration may comprise a maximum number of distinct tasks allowed to be performed in parallel. The distinct tasks may be related to different user identities.

The maximum number of distinct tasks allowed to be performed in parallel may correspond to multiple types of tasks, or each of the multiple types of tasks.

The at least one processor may be configured to present (e.g., display or make an audio sound to inform) at least one of whether any tasks are in progress in the device, the type of tasks allowed to be performed in parallel, or whether performing a task related to the type is allowed to be further accommodated by the device.

The time information including at least one of the start time or the duration may be synchronized based on a global reference time clock or a local reference time clock. Based on that the global reference time clock and the local reference time clock are compromised, tasks in progress in the device may be stopped.

The at least one processor may be configured to may comprise a robot user equipment (UE). The robot UE may be in communication with at least one of a UE, a network, or autonomous vehicles other than the robot UE.

Hereinafter, a processor for a device in a wireless communication system, according to some embodiments of the present disclosure, will be described.

The processor may be configured to receive, from a network, a configuration for enabling multiple tasks to be performed in parallel. The processor may be configured to determine a type of tasks allowed to be performed in parallel based on the configuration. The processor may be configured to receive a first input for requesting to perform a first task related to the type. The first input may be related to a first user identity. The processor may be configured to initiate to perform the first task related to the type. The processor may be configured to receive a second input for requesting to perform a second task while performing the first task related to the type. The second input may be related to a second user identity. Based on that the second task is related to the type, the processor may be configured to initiate to perform the second task. Based on that the second task is related to a different type, the processor may be configured to reject to perform the second task.

Hereinafter, a non-transitory computer-readable medium has stored thereon a plurality of instructions for a device in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a device.

The stored a plurality of instructions may cause the device to receive, from a network, a configuration for enabling multiple tasks to be performed in parallel; determine a type of tasks allowed to be performed in parallel based on the configuration; receive a first input for requesting to perform a first task related to the type, the first input being related to a first user identity; initiate to perform the first task related to the type; receive a second input for requesting to perform a second task while performing the first task related to the type, the second input being related to a second user identity; based on that the second task is related to the type, initiate to perform the second task; and based on that the second task is related to a different type, reject to perform the second task.

The present disclosure may have various advantageous effects.

For example, according to various embodiments, multiple tasks related to a single user identity or multiple user identities can be performed in parallel effectively, which improves the utilization of robots, so that the average waiting time for a customer with a task to be performed can be reduced and the number of robots required for the tasks to be performed can be reduced.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a device comprising:
receiving, from a network, a configuration for enabling multiple tasks to be performed in parallel;
determining a type of tasks allowed to be performed in parallel based on the configuration;
receiving a first input for requesting to perform a first task related to the type, wherein the first input is related to a first user identity;

initiating to perform the first task related to the type;
receiving a second input for requesting to perform a second task while performing the first task related to the type, wherein the second input is related to a second user identity;
based on that the second task is related to the type, initiating to perform the second task; and
based on that the second task is related to a different type, rejecting to perform the second task.

2. The method of claim 1, further comprising:
determining a start time and a duration based on the configuration.

3. The method of claim 2, wherein the start time is a time at which the configuration is started to be applied, and
wherein the duration is a time period during which the configuration is to be applied.

4. The method of claim 2, wherein the start time comprises a time epoch at or after which each task is allowed to get started by the robot, and
wherein the duration is a time period during which each task is allowed to be to be performed by the robot.

5. The method of claim 2, wherein the configuration comprises a mode of operation set to a committed mode, and
wherein the configuration comprises at least one of the start time, the duration or the type of tasks.

6. The method of claim 2, wherein the configuration comprises a mode of operation set to an automated mode, and
wherein at least one of the start time, the duration or the type of tasks is autonomously determined by the device.

7. The method of claim 6, further comprising:
transmitting, to the network, a configuration response for the configuration,
wherein the configuration response comprises at least one of the start time, the duration or the type of tasks.

8. The method of claim 2, wherein time information including at least one of the start time or the duration is synchronized based on a global reference time clock or a local reference time clock, and
wherein, based on that the global reference time clock and the local reference time clock are compromised, tasks in progress in the device are stopped.

9. The method of claim 1, wherein the configuration comprises a maximum number of distinct tasks allowed to be performed in parallel.

10. The method of claim 9, wherein the distinct tasks are related to different user identities.

11. The method of claim 9, wherein the maximum number of distinct tasks allowed to be performed in parallel corresponds to multiple types of tasks, or each of the multiple types of tasks.

12. The method of claim 1, further comprising:
presenting at least one of whether any tasks are in progress in the device, the type of tasks allowed to be performed in parallel, or whether performing a task related to the type is allowed to be further accommodated by the device.

13. The method of claim 1, wherein the device comprises a robot user equipment (UE), and
wherein the robot UE is in communication with at least one of a UE, a network, or autonomous vehicles other than the robot UE.

14. A device in a wireless communication system comprising:
a transceiver;
a memory; and
at least one processor operatively coupled to the transceiver and the memory, and configured to:
control the transceiver to receive, from a network, a configuration for enabling multiple tasks to be performed in parallel;
determine a type of tasks allowed to be performed in parallel based on the configuration;
receive a first input for requesting to perform a first task related to the type, wherein the first input is related to a first user identity;
initiate to perform the first task related to the type;
receive a second input for requesting to perform a second task while performing the first task related to the type, wherein the second input is related to a second user identity;
based on that the second task is related to the type, initiate to perform the second task; and
based on that the second task is related to a different type, reject to perform the second task.

15. A computer-readable medium having recorded thereon a program for performing each step of a method on a computer, the method comprising:
receiving, from a network, a configuration for enabling multiple tasks to be performed in parallel;
determining a type of tasks allowed to be performed in parallel based on the configuration;
receiving a first input for requesting to perform a first task related to the type, wherein the first input is related to a first user identity;
initiating to perform the first task related to the type;
receiving a second input for requesting to perform a second task while performing the first task related to the type, wherein the second input is related to a second user identity;
based on that the second task is related to the type, initiating to perform the second task; and
based on that the second task is related to a different type, rejecting to perform the second task.

16. A processor for a wireless device in a wireless communication system, wherein the processor is configured to control the wireless device to perform operations comprising:
receiving, from a network, a configuration for enabling multiple tasks to be performed in parallel;
determining a type of tasks allowed to be performed in parallel based on the configuration;
receiving a first input for requesting to perform a first task related to the type, wherein the first input is related to a first user identity;
initiating to perform the first task related to the type;
receiving a second input for requesting to perform a second task while performing the first task related to the type, wherein the second input is related to a second user identity;
based on that the second task is related to the type, initiating to perform the second task; and
based on that the second task is related to a different type, rejecting to perform the second task.

* * * * *